US008842069B2

(12) United States Patent
Choi et al.

(10) Patent No.: US 8,842,069 B2
(45) Date of Patent: Sep. 23, 2014

(54) INPUT APPARATUS FOR MULTI-LAYER ON SCREEN DISPLAY AND METHOD OF GENERATING INPUT SIGNAL FOR THE SAME

(75) Inventors: Eun-seok Choi, Anyang-si (KR); Dong-yoon Kim, Seoul (KR); Jong-koo Oh, Yongin-si (KR); Won-chul Bang, Seongnam-si (KR); Wook Chang, Seoul (KR); Sung-jung Cho, Suwon-si (KR); Kyoung-ho Kang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1280 days.

(21) Appl. No.: 10/995,940

(22) Filed: Nov. 24, 2004

(65) Prior Publication Data

US 2005/0162382 A1 Jul. 28, 2005

(30) Foreign Application Priority Data

Nov. 26, 2003 (KR) ........................ 10-2003-0084725

(51) Int. Cl.
*G09G 5/00* (2006.01)
*G06F 3/0346* (2013.01)
*G06F 3/0481* (2013.01)

(52) U.S. Cl.
CPC ............ *G06F 3/0481* (2013.01); *G06F 3/0346* (2013.01)
USPC ...................... 345/156; 348/14.03; 348/14.05; 715/740

(58) Field of Classification Search
USPC ................................................ 345/156–184
See application file for complete search history.

(56) References Cited

U.S. PATENT DOCUMENTS

| 5,714,972 | A | * | 2/1998 | Tanaka et al. | 345/156 |
|---|---|---|---|---|---|
| 5,825,350 | A | | 10/1998 | Case et al. | |
| 5,902,968 | A | | 5/1999 | Sato et al. | |
| 6,166,778 | A | * | 12/2000 | Yamamoto et al. | 348/569 |
| 6,201,554 | B1 | * | 3/2001 | Lands | 345/169 |
| 6,212,296 | B1 | | 4/2001 | Stork et al. | |
| 6,300,951 | B1 | * | 10/2001 | Filetto et al. | 715/797 |
| 6,369,794 | B1 | * | 4/2002 | Sakurai et al. | 345/156 |
| 6,931,596 | B2 | * | 8/2005 | Gutta et al. | 715/728 |
| 7,030,856 | B2 | * | 4/2006 | Dawson et al. | 345/158 |
| 7,233,316 | B2 | * | 6/2007 | Smith et al. | 345/157 |

(Continued)

FOREIGN PATENT DOCUMENTS

| JP | 9-303026 A | 11/1997 |
|---|---|---|
| JP | 11-285083 A | 10/1999 |

OTHER PUBLICATIONS

Dissanayake, G. et., al. "The Aiding of a Low-Cost Strapdown Inertial Measurement Unit Using Vehicle Model Constraints for Land Vehicle Applications" IEEE Transactions on Robotics and Automation, vol. 17, No. 5, Oct. 2001, pp. 731-747.

*Primary Examiner* — Seokyun Moon
(74) *Attorney, Agent, or Firm* — Sughrue Mion, PLLC

(57) ABSTRACT

An input apparatus for a multi-layer on-screen display and a method of generating an input signal for a multi-layer on-screen display. The input apparatus includes: an acceleration sensing unit for sensing an acceleration of a motion of the input apparatus; a processing unit for obtaining information including a motion depth and a motion pattern of the input apparatus using the sensed acceleration and determining a layer to be activated from the information; and a transmitter for generating a signal including the determined layer and outputting the signal to the multi-layer OSD.

18 Claims, 5 Drawing Sheets

(56) References Cited

U.S. PATENT DOCUMENTS

| | | | |
|---|---|---|---|
| 7,694,237 B2* | 4/2010 | Pusa et al. | 715/841 |
| 2002/0024506 A1* | 2/2002 | Flack et al. | 345/169 |
| 2003/0063068 A1* | 4/2003 | Anton et al. | 345/158 |
| 2004/0048571 A1* | 3/2004 | Kiyose | 455/41.2 |
| 2004/0259651 A1* | 12/2004 | Storek | 473/131 |

* cited by examiner

INPUT APPARATUS FOR MULTI-LAYER ON SCREEN DISPLAY AND METHOD OF GENERATING INPUT SIGNAL FOR THE SAME

BACKGROUND OF THE INVENTION

This application claims the priority from Korean Patent Application No. 2003-84725,filed on Nov. 26, 2003, in the Korean Intellectual Property Office, the disclosure of which is incorporated herein in its entirety by reference.

1. Field of the Invention

The present invention relates to an input apparatus for a multi-layer on-screen display and a method of generating an input signal for the same.

2. Description of the Related Art

An on-screen display (OSD) is a program used to select menus in TVs or monitors. A conventional OSD used in display devices such as TVs and monitors is configured with one layer. In the one-layer OSD, a menu selection is realized using a hierarchy method of searching from an upper menu to a lower menu in the lower menu selection. That is, to select a lower menu, an upper menu is first selected and then the lower menu is selected step by step, and to select another lower menu, an upper menu is first selected again and then the lower menu is selected step by step. The menu selection method is not so inconvenient for TVs or monitors in which a number of menus is small. However, in TVs or monitors in which a plurality of menus are required due to various functions, the one-layer OSD is inconvenient to users.

The problem can be solved using a multi-layer OSD. Since the multi-layer OSD includes multiple layers each including a plurality of menus, a menu can be selected while moving among the layers. The multi-layer OSD can be utilized as a menu selection method of digital TVs requiring various functional menus.

As an input apparatus for the multi-layer OSD, there is a conventional remote control device using buttons. However, the conventional remote control device requires a plurality of additional buttons for each layer. Therefore, there is a need for an input apparatus for inputting signals on the basis of a user's input operation and an input signal generating method for the same.

SUMMARY OF THE INVENTION

The present invention provides an input apparatus for generating a signal input to a multi-layer OSD by sensing acceleration information according to a signal input operation by a user and extracting position information of a 3-dimensional space using the sensed acceleration information and an input signal generating method for the same.

According to an exemplary embodiment of the present invention, there is provided an input apparatus for a multi-layer OSD, the apparatus comprising: an acceleration sensing unit for sensing an acceleration of a motion of the input apparatus; a processing unit for obtaining information including a motion depth and a motion pattern of the input apparatus using the sensed acceleration and determining a layer to be activated from the information; and a transmitter for generating a signal including the determined layer and outputting the signal to the multi-layer OSD.

According to another exemplary embodiment of the present invention, there is provided a method of generating an input signal for a multi-layer OSD using a predetermined input apparatus, the method comprising: sensing an acceleration of a motion of the input apparatus; obtaining information including a motion depth and a motion pattern of the input apparatus using the sensed acceleration; determining a layer to be activated from the information; and outputting the determined layer to the multi-layer OSD.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will now be described more fully with reference to the accompanying drawings, in which exemplary embodiments of the invention are shown.

Figure 1:
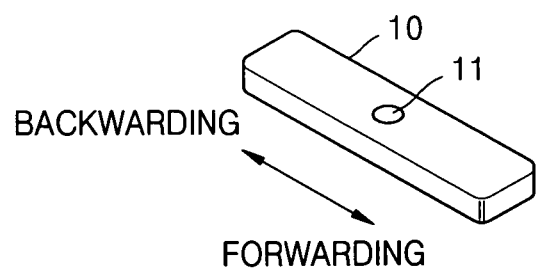
FIG. 1 illustrates an exterior view of an input apparatus of a multi-layer OSD according to an exemplary embodiment of the present invention.

FIG. 1 illustrates an exterior view of an input apparatus of a multi-layer OSD according to an exemplary embodiment of the present invention. Referring to FIG. 1, an input apparatus includes a body part 10 and a button 11 attached to a portion of the body part 10. A signal is input by a user pushing the button 11 and moving the body part 10 backward/forward. Though the input apparatus of a multi-layer OSD shown in FIG. 1 is an independent apparatus, it can be realized by being embedded into a conventional remote control device.

Figure 2:
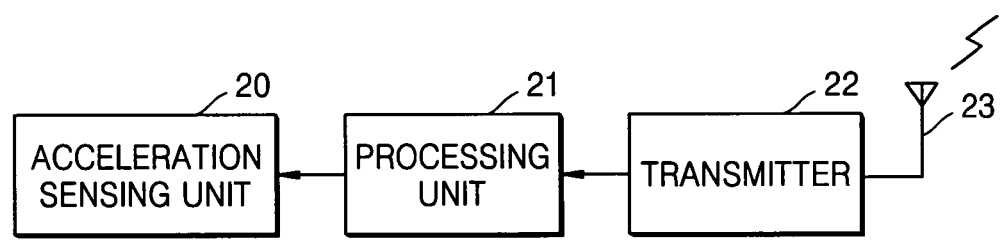
FIG. 2 is a schematic block diagram of the inside of a body part of FIG. 1.

FIG. 2 is a schematic block diagram of the inside of the body part 10 of FIG. 1. Referring FIG. 2, the body part 10 includes an acceleration sensing unit 20, a processing unit 21, and a transmitter 22. The transmitter 22 transmits input signals via an antenna 23 in a wireless environment. Also, the transmitter 22 can transmit input signals via a wired interface.

The acceleration sensing unit 20 senses an acceleration of a motion when a user operates an input apparatus for inputting a signal and includes a 3-axial acceleration sensor. When the user lets a front part of the input apparatus face an OSD and moves the input apparatus forward/backward, the 3-axial acceleration sensor senses the motion of the body part 10 and outputs an acceleration signal.

In general, in order to estimate a position and an orientation of a moving object in a 3-dimensional space without an external reference, a 3-dimensional inertial navigation system (INS) based on 3-axial acceleration information and 3-axial angular velocity information is used. An orientation of the INS can be obtained by solving integral equations of angular velocity measured by a gyroscope, which is an angular velocity sensor. The position can be obtained by removing a gravity component from the acceleration measured by the acceleration sensor in consideration of the orientation of the INS and calculating a double integral over time. Since the orientation of the INS includes an error proportional to time for a measurement error of the angular velocity due to a measurement error of the gyroscope, the acceleration in which the gravity component has been removed also includes an error proportional to time of a measurement error of the angular velocity. Therefore, the position includes an error proportional to the square of time for a measurement error of the acceleration and an error proportional to the cube of time for a measurement error of the angular velocity. Since the errors rapidly increase in proportion to time, it is very difficult to calculate a position using an inertial sensor for a long time period. Accordingly, in the present invention, only an acceleration sensor relatively less sensitive to errors is used.

The processing unit 21 calculates a position of the input apparatus from an acceleration value output from the acceleration sensing unit 20. For this, the processing unit 21 converts an acceleration value output from the acceleration sensing unit 20 into a digital acceleration value, performs a proper operation on the digital acceleration value, and outputs a layer selection signal to be input to the multi-layer OSD.

The transmitter 22 includes a wireless communication module for converting the layer selection signal into a proper wireless signal such as an infrared signal and transmitting the wireless signal via the antenna 23. Also, the transmitter 22 can include a wired communication module.

Figure 3:
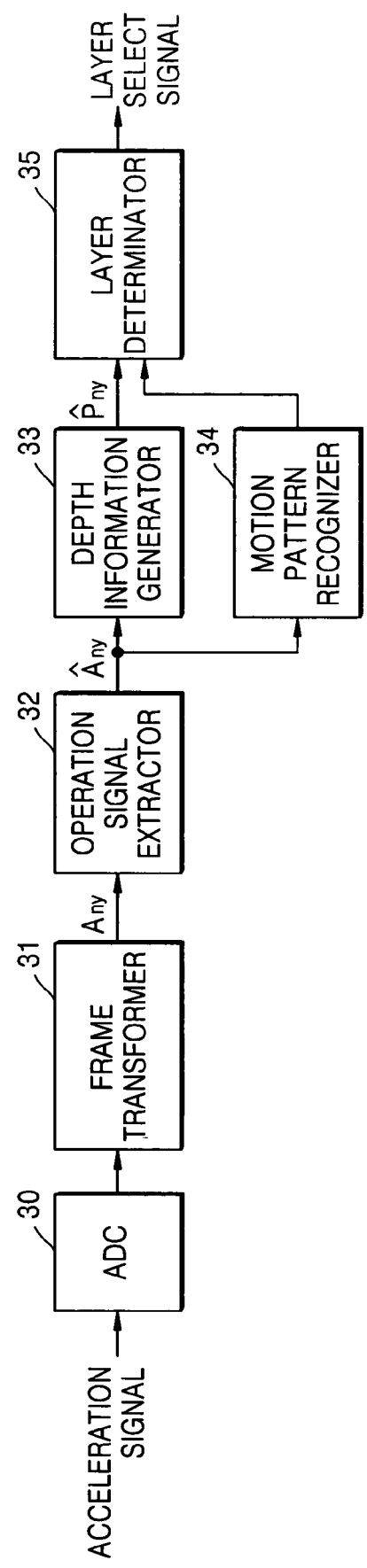
FIG. 3 is a block diagram of a processing unit of FIG. 2.

FIG. 3 is a block diagram of the processing unit 21 of FIG. 2. Referring to FIG. 3, the processing unit 21 includes an analog-to-digital converter (ADC) 30, a frame transformer 31, an operation signal extractor 32, a depth information generator 33, a motion pattern recognizer 34, and a layer determinator 35.

The ADC 30 converters the acceleration value output from the acceleration sensing unit 20 into the digital acceleration value. The ADC 30 can further include a low pass filter to reduce noise of the acceleration signal output from the acceleration sensing unit 20. Here, the noise is a high frequency component inherited in the acceleration sensing unit 20 or mixed in the acceleration signal from neighbor elements.

The frame transformer 31 performs frame transformation on the acceleration signal output from the ADC 30. Here, the frame transformation means that the acceleration signal sensed by the acceleration sensing unit 20 in a body frame, which takes a point on the input apparatus as an origin, is transformed into an acceleration signal in a navigation frame, which takes a point in a space where the input apparatus is placed as an origin. To perform the frame transform, the frame transformer 31 calculates an orientation of the input apparatus from the acceleration signal. The orientation is obtained by calculating parameters indicating the orientation of the input apparatus in the navigation frame from the acceleration information according to a well-known INS theory. The parameters may be exemplified by Euler angles, that is, a yaw angle $\psi$ for a rotation around the z-axis of the input apparatus, a pitch angle $\theta$ for a rotation around the y-axis after the z-axis rotation, and a roll angle $\phi$ for a rotation around the x-axis after the y-axis rotation. The pitch angle and roll angle are calculated as shown in Equation 1.

$$\phi = \tan^{-1}\left(\frac{A_{by}}{A_{bz}}\right) \quad (1)$$

$$\theta = \sin^{-1}\left(\frac{A_{bx}}{g}\right), \text{ or } \theta = \tan^{-1}\left(\frac{A_{bx}}{\sqrt{A_{by}^2 + A_{bz}^2}}\right)$$

Here, $A_{bx}$, $A_{by}$, $A_{bz}$ are acceleration signals in the body frame output from the acceleration sensor attached to the input apparatus, and g is acceleration of gravity.

The yaw angle is rarely varied since a user mainly moves the input apparatus forward and backward. Accordingly, it can be acceptable that $\psi=0$.

The frame transformer 31 obtains acceleration in the navigation frame using the Euler angles obtained from Equation 1 and $\psi=0$. In the present exemplary embodiment, an input is performed by moving the input apparatus forward and backward, and the forward and backward movement is performed along the y-axis of the navigation frame. Therefore, only an acceleration component $A_{ny}$ of the y-axis direction of the acceleration signal in the navigation frame is considered. $A_{ny}$ is obtained from the Euler angles as shown in Equation 2.

$$A_{ny} = \cos\theta \sin\psi A_{bx} + (\cos\phi \cos\psi + \sin\phi \sin\theta \sin\psi)A_{by} + (-\sin\phi \cos\psi + \cos\phi \sin\theta \sin\psi)A_{bx} \quad (2)$$

When $\psi=0$, Equation 2 is simplified to Equation 3.

$$A_{ny} = \cos\phi A_{by} - \sin\phi A_{bz} \quad (3)$$

The frame transformer 31 can further include a low pass filter to remove a high frequency component from the $A_{ny}$ value.

The operation signal extractor 32 extracts a user's operation signal by comparing $A_{ny}$ to a predetermined threshold value to remove a noise signal generated by the user's hand trembles or etc., even if the user does not move the input apparatus. That is, if an absolute value of $A_{ny}$ is smaller than the threshold value $C_{th1}$, it is regarded that the user does not operate the input apparatus, and if the absolute value of $A_{ny}$ is larger than the threshold value $C_{th1}$, it is regarded that the user operates the input apparatus. Also, to obtain position information later, $A_{ny}$ is changed as shown in Equation 4.

$$\hat{A}_{ny} = \begin{cases} 0; \text{ if } |A_{ny}| \langle C_{th1} \\ A_{ny} - C_{th1}; \text{ if } A_{ny} \rangle C_{th1} \\ A_{ny} + C_{th1}; \text{ if } A_{ny} \langle -C_{th1} \end{cases} \quad (4)$$

Here, $\hat{A}_{ny}$ is an output of the operation signal extractor 32, and $C_{th1}$ is a constant larger than 0. Provided that $C_{th1}$ can be larger than a value output from the acceleration sensor, which is output by the user's hand trembles not by a user's intended operation and by drift of the acceleration sensor.

In detail, if an absolute value of $A_{ny}$ is smaller than $C_{th1}$, it is determined that there is no user's intended operation. Accordingly, it is regarded that there is no motion. Also, during a forward or backward operation, if $A_{ny}$ is larger than $C_{th1}$ or smaller than $-C_{th1}$, it is determined that a user moves the input apparatus intentionally. Then, $C_{th1}$ is added to or subtracted from a measured value.

The depth information generator 33 and the motion pattern recognizer 34 extract motion information such as depth of the motion and whether forward or backward motion occurs, respectively. That is, information of which direction and how far the input apparatus is moved is extracted. The depth information generator 33 generates depth information using $\hat{A}_{ny}$. Here, the depth information is a value indicating how far the input apparatus is moved from a current position. The depth information $\hat{P}_{ny}$ is obtained by integrating $\hat{V}_{ny}$, and $\hat{V}_{ny}$ is obtained by integrating an absolute value of $\hat{A}_{ny}$.

The motion pattern recognizer 34 classifies patterns of stop, forward, and backward from a value and sign of $\hat{A}_{ny}$. A previous pattern is maintained until another pattern is sensed. If by $\hat{A}_{ny}=0$ during a first time period $T_1$, the operation is recognized as a stop, if $\hat{A}_{ny}$ is changed from 0 to $\hat{A}_{ny}>0$ during a second time period $T_2$, the operation is recognized as forward. If $\hat{A}_{ny}$ is changed from 0 to $\hat{A}_{ny}<0$ during the second time period $T_2$, the operation is recognized as backward. Here, $T_1$ and $T_2$ may vary depending on application or systems.

The layer determinator 35 determines a layer according to the value $\hat{P}_{ny}$ obtained by the depth information generator 33 and the result obtained by the motion pattern recognizer 34 and outputs the determined layer as a layer select signal. If the value $\hat{P}_{ny}$ is larger than a predetermined threshold value $C_{th2}$ ($C_{th2}$ is a constant larger than 0) and the result obtained by the motion pattern recognizer 34 is the forward operation, the layer determinator 35 increases a present layer by one and resets values of $\hat{V}_{ny}$ and $\hat{P}_{ny}$ to 0.

If the value $\hat{P}_{ny}$ is larger than the predetermined threshold value $C_{th2}$ and the result obtained by the motion pattern recognizer 34 is the backward operation, the layer determinator 35 decreases the present layer by one and resets values of $\hat{V}_{ny}$ and $\hat{P}_{ny}$ to 0. The reset is to initialize the values of $\hat{V}_{ny}$ and $\hat{P}_{ny}$ in a currently determined layer. If the value $\hat{P}_{ny}$ is not larger than the predetermined threshold value $C_{th2}$, the layer determinator 35 maintains a current layer. Here, the predetermined threshold value $C_{th2}$ is a value for determining a motion of the input apparatus to be an intended input by the user only when the input apparatus is moved more than a predetermined distance. $C_{th2}$ can be determined by experiments.

The layer determinator 35 outputs a layer select signal according to results output from the depth information generator 33 and the motion pattern recognizer 34. The layer select signal includes a layer to be activated of total layers. For example, if a second layer is active now and it is determined that a forward operation occurs, a signal activating a third layer becomes the layer select signal. Likewise, if a second layer is active now and it is determined that a backward operation occurs, a signal activating a first layer becomes the layer select signal.

If a currently activated layer is the uppermost layer and it is determined that a forward operation is ensued, the layer determinator 35 maintains the activated uppermost layer. In another exemplary embodiment, if a currently activated layer is the uppermost layer and it is determined that a forward operation is ensued, the layer determinator 35 can outputs the layer select signal so as to activate the lowest layer in a circulating pattern.

On the contrary, if a currently activated layer is the lowest layer and it is determined that a backward operation is ensued, the layer determinator 35 maintains the activated lowest layer. In another exemplary embodiment, if a currently activated layer is the lowest layer and it is determined that a backward operation is ensued, the layer determinator 35 can outputs the layer select signal so as to activate the uppermost layer in a circulating pattern.

Figure 4:
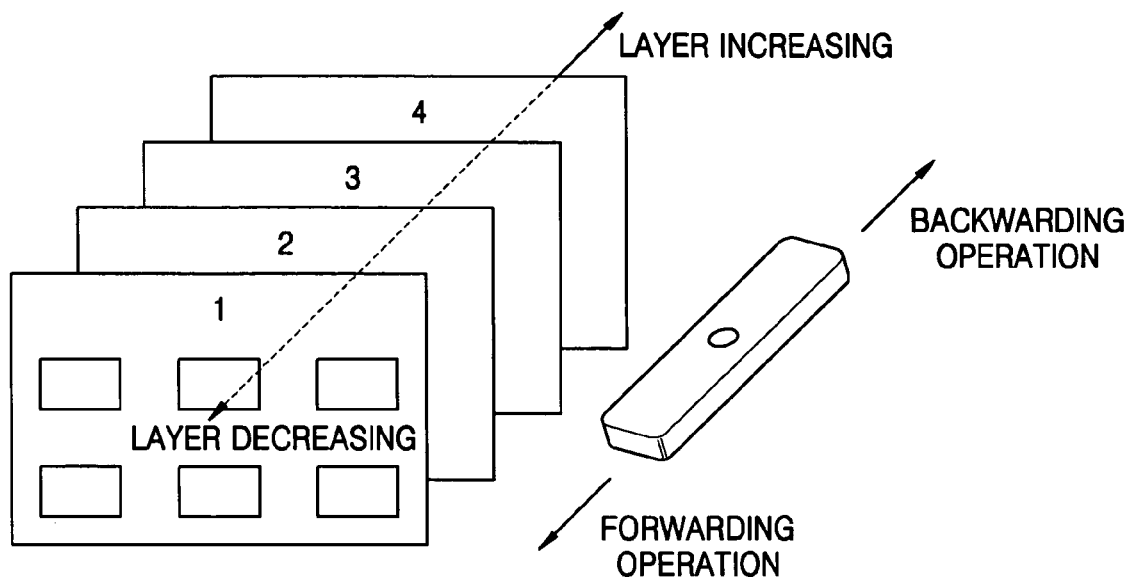
FIG. 4 illustrates layer increasing/decreasing in response to a layer selection signal according to an embodiment of the present invention.

FIG. 4 illustrates layer increasing/decreasing in response to a layer selection signal according to an exemplary embodiment of the present invention. Referring to FIG. 4, an active layer increases or decreases according to a forward/backward operation of an input apparatus. Also, if layer 4 is activated now and the forward operation occurs, the layer determinator 35 maintains layer 4 active. On the contrary, if layer 1 is active now and the backward operation occurs, the layer determinator 35 maintains layer 1 active.

FIGS. 5 and 6 illustrate how layers are changed when the input apparatus is moved. The number of layers is 4, and an initial layer is layer 1.

Referring to FIGS. 5 and 6, movement between layers is set so as to forward from a stop status set as the layer 1, pass through layer 2 and layer 3, and reach layer 4, and to backward from layer 4, pass through layer 3 and layer 2, and finish the operation at layer 1.

Figure 5A:
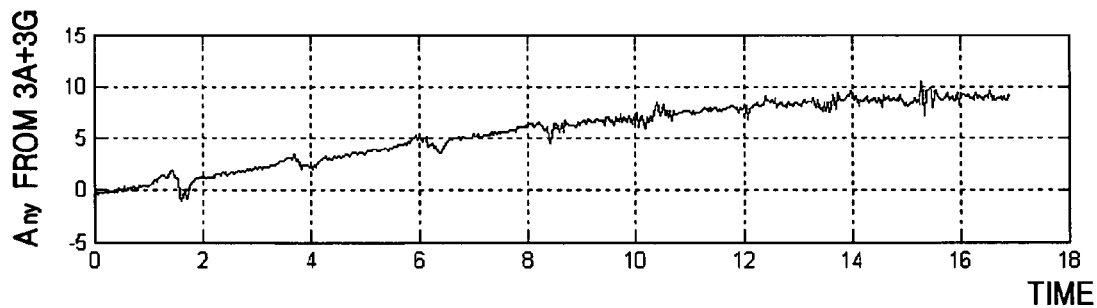
FIG. 5A illustrates Y-axial acceleration versus time in a navigation frame when both of the acceleration and angular velocity are measured in a body frame.
Figure 5B:
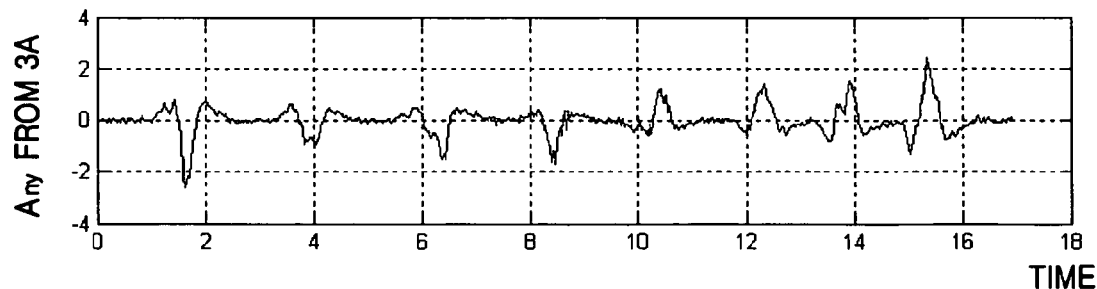
FIG. 5B illustrates Y-axial acceleration versus time in a navigation frame when the acceleration is measured in a body frame according to an exemplary embodiment of the present invention.

FIG. 5A illustrates Y-axial acceleration versus time in a navigation frame when both of the acceleration and angular velocity are measured in a body frame. FIG. 5B illustrates Y-axial acceleration versus time in the navigation frame when the acceleration is measured in the body frame according to an exemplary embodiment of the present invention. Comparing FIG. 5A and FIG. 5B, the acceleration is unstable since the acceleration is continuously increasing with time in FIG. 5A, however, a moving status and a stop status can be discriminated in FIG. 5B.

Figure 6A:
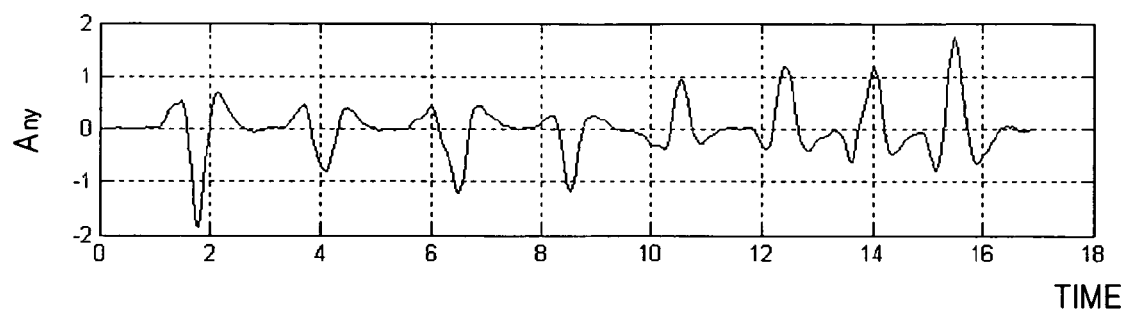
FIG. 6A illustrates a low pass filtering result of an acceleration signal of FIG. 5B for removing high frequency components from the acceleration signal.
Figure 6B:
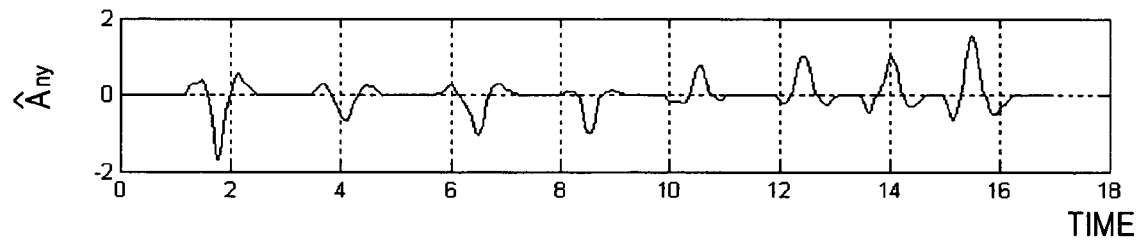
FIG. 6B illustrates a signal output from an operation signal extractor.
Figure 6C:
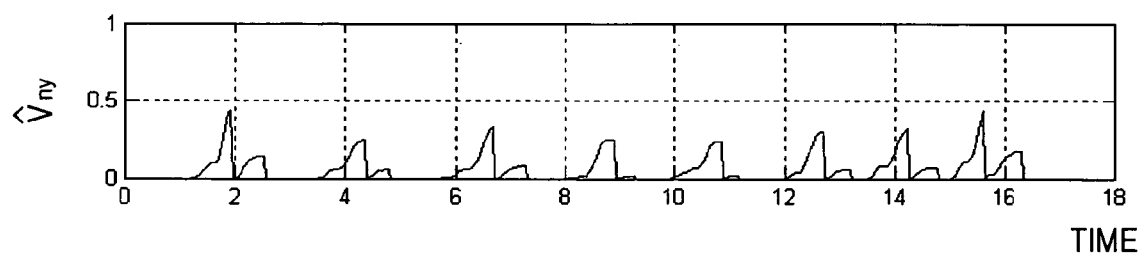
FIG. 6C illustrates a signal which is an integral of an absolute value of the signal of FIG. 6B.
Figure 6D:
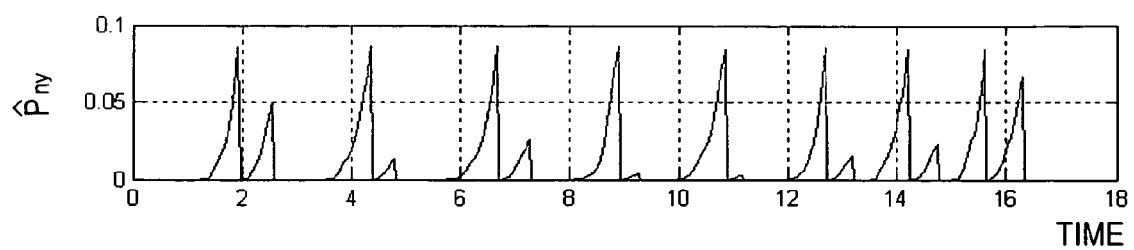
FIG. 6D illustrates depth information which is an integral of the signal of FIG. 6C.

FIG. 6A illustrates a low pass filtering result of an acceleration signal of FIG. 5B for removing a high frequency component from the acceleration signal. FIG. 6B illustrates a signal output from the operation signal extractor 32. FIG. 6C illustrates a signal which is an integral of an absolute value of the signal of FIG. 6B. FIG. 6D illustrates depth information that is an integral of the signal of FIG. 6C.

Figure 6E:
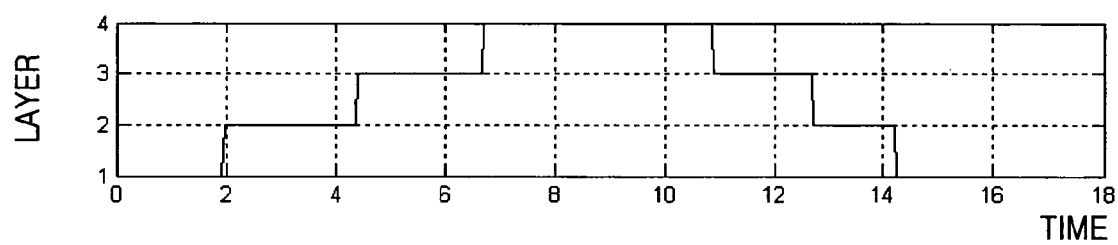
FIG. 6E illustrates a layer selection signal output according to the depth information of FIG. 6D.

FIG. 6E illustrates a layer selection signal output according to the depth information of FIG. 6D. Referring to FIG. 6E, the layer selection signal is output with some delay compared with the depth information of FIG. 6D. Also, referring to FIG. 6B, if a forward operation signal is generated between 8 seconds and 10 seconds when layer 4 is active, the layer selection signal still activates layer 4. Likewise, if a backward operation signal is generated between 14 seconds and 16 seconds when layer 1 is active, the layer selection signal still activates layer 1.

As described above, in realizing an input apparatus for a multi-layer OSD, the input apparatus can be realized using only a 3-axial acceleration sensor. Accordingly, the size and consumption power of the apparatus can be reduced and expenses also can be cut down. Since complex computation, such as rotating angle calculation according to angular velocity sensing, does not have to be performed, a high performance microprocessor is not necessary.

In an aspect of a user interface, since a layer can be selected using only forward/backward operations, the input apparatus can be easily handled.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A system for a multi-layer on-screen display (OSD), the system comprising:
    a remote control device comprising:
        an acceleration sensing unit which senses an acceleration of a motion of the remote control device using a 3-axis acceleration sensor;
        a processing unit which determines a motion depth and a motion pattern of the remote control device based on the acceleration sensed by the acceleration sensing unit, and determines a layer to be activated from the motion depth and the motion pattern; and
a transmitter which generates a signal indicating the layer determined by the processing unit and outputs the signal to the multi-layer OSD,
and a display unit which receives the signal from the transmitter and performs a corresponding multi-layer OSD function,
wherein the motion depth is a distance the remote control device is moved along in each direction of 3 axes and the motion pattern is the direction the remote control device is moved along the axis,
wherein the motion pattern includes at least one of a backward operation and a forward operation towards the display unit,
wherein the multi-layer OSD is displayed on a digital television for performing menu selection and does not incorporate a hierarchical menu structure, and
wherein the processing unit comprises:
an analog-to-digital converter (ADC) which converts the acceleration sensed by the acceleration sensing unit into a digital acceleration value;
a frame transformer which transforms the digital acceleration value in a body frame of the remote control device into a first acceleration value in a navigation frame;
an operation signal extractor which determines whether the motion is intended by a user from the first acceleration value in the navigation frame and outputs a second acceleration value based on whether the motion is intended by the user;
a motion information extractor which determines the motion depth from the second acceleration value output from the operation signal extractor and recognizes the motion pattern; and
a layer determinator for determining the layer to be activated according to the motion depth and the motion pattern 2. The system of claim 1, wherein the frame transformer determines parameters indicating an orientation of the remote control device in the navigation frame from the digital acceleration value in the body frame and determines the first acceleration value in the navigation frame from the parameters.

3. The system of claim 2, wherein the frame transformer determines only an acceleration component related to the motion pattern of the remote control device from the first acceleration value in the navigation frame.

4. The system of claim 1, wherein the ADC removes a high frequency component of the acceleration sensed by the acceleration sensing unit.

5. The system of claim 1, wherein the operation signal extractor determines whether the motion is intended according to a following equation by comparing the first acceleration value $A_{ny}$ output from the frame transformer to a threshold value $C_{th1}$ and adjusts the first acceleration value $A_{ny}$ to the second acceleration value $\hat{A}_{ny}$ ;

$$\hat{A}_{ny} = \begin{cases} 0; \text{if} |A_{ny}| \langle C_{th1} \\ A_{ny} - C_{th1}; \text{if } A_{ny} \rangle C_{th1} \\ A_{ny} + C_{th1}; \text{if } A_{ny} \langle -C_{th1}. \end{cases}$$

6. The system of claim 1, wherein the motion information extractor comprises:
a depth information generator which determines the motion depth by double integrating an absolute value of the second acceleration value output from the operation signal extractor; and
a motion pattern recognizer which determines whether a forward operation or backward operation of the remote control device occurs according to a sign of the second acceleration value output from the operation signal extractor.

7. The system of claim 1, wherein the layer determinator increases or decreases the layer to be activated by one if the motion depth is larger than a predetermined threshold value and the motion is determined to be a forward or backward operation of the remote control device.

8. The system of claim 7, wherein the layer determinator determines that there is no motion if the motion depth is not larger than the predetermined threshold value.

9. The system of claim 1, wherein the layer determinator determines that there is no motion if the motion depth is not larger than a predetermined threshold value.

10. A method for a multi-layer on-screen display (OSD) using a remote control device and a display unit, the method comprising:
(a) sensing an acceleration of a motion of the remote control device using a 3-axis acceleration sensor, at the remote control device;
(b) determining a motion depth and a motion pattern of the remote control device based on the acceleration, at the remote control device;
(c) determining a layer to be activated from the motion depth and the motion pattern, at the remote control device;
(d) outputting the layer which is determined to the multi-layer OSD, at the remote control device; and
(e) receiving the layer to perform the multi-layer OSD function,
wherein the motion depth is a distance the remote control device is moved along in each direction of 3 axes and the motion pattern is the direction the remote control device is moved along the axis,
wherein the motion pattern includes at least one of a backward operation and a forward operation towards the display unit,
wherein the method for the multi-layer OSD is performed as a menu selection method on a digital television and does not incorporate a hierarchical menu structure, and
wherein in step (b), determining the motion depth comprises:
(b1) transforming an acceleration value in a body frame of the remote control device into an acceleration value in a navigation frame;
(b2) determining whether the motion is intended by a user from the acceleration value in the navigation frame;
(b3) determining the motion depth by double integrating an absolute value of the acceleration value in the navigation frame if the motion is intended by the user.

11. The method of claim 10, wherein step (b1) comprises:
(b11) determining parameters indicating an orientation of the remote control device from the acceleration value in the body frame; and
(b12) determining the acceleration value in the navigation frame from the parameters.

12. The method of claim 11, wherein the parameters are Euler angles of a yaw angle $\psi$, a pitch angle $\theta$, and a roll angle $\phi$, and are obtained as follows:

$$\phi = \tan^{-1}\left(\frac{A_{by}}{A_{bz}}\right)$$

-continued $$\theta = \sin^{-1}\left(\frac{A_{bx}}{g}\right), \text{ or } \theta = \tan^{-1}\left(\frac{A_{bx}}{\sqrt{A_{by}^2 + A_{bz}^2}}\right)$$

$$\psi = 0$$

where g is acceleration of gravity, and $A_{bx}$, $A_{by}$ and $A_{bz}$ are x, y and z-axial acceleration components of the body frame, respectively.

13. The method of claim 12, wherein the acceleration value $A_{ny}$ of the navigation frame is determined as follows:

$A_{ny}$=cos θ sin ψ$A_{bx}$+(cos φ cos ψ+sin φ sin θ sin ψ)$A_{by}$+ (−sin φ cos ψ+cos φ sin θ sin ψ)$A_{bz}$ where $A_{bx}$, $A_{by}$, $A_{bz}$ are x, y, and z-axis acceleration components of the body frame, respectively.

14. The method of claim 13, wherein step (b2) comprises determining whether the motion is intended by comparing an absolute value of the acceleration value $A_{ny}$ with a predetermined threshold value $C_{th1}$ and adjusting the acceleration value $A_{ny}$ to $\hat{A}_{ny}$ as follows:

$$\hat{A}_{ny} = \begin{cases} 0; \text{ if } |A_{ny}| \langle C_{th1} \\ A_{ny} - C_{th1}; \text{ if } A_{ny} \rangle C_{th1} \\ A_{ny} + C_{th1}; \text{ if } A_{ny} \langle -C_{th1}, \end{cases} \text{ and}$$

step (b3) comprises determining the motion depth by double integrating an absolute value of the acceleration value $\hat{A}_{ny}$ in the navigation frame if the motion is intended by the user.

15. The method of claim 10, wherein in step (b), determining the motion pattern comprises:
  (b1) transforming an acceleration value in a body frame of the remote control device into an acceleration value in a navigation frame;
  (b2) determining whether the motion is intended from the acceleration value in the navigation frame;
  (b3) determining whether a forward operation or a backward operation of the remote control device from a sign of the acceleration value in the navigation frame if the motion is intended.

16. The method of claim 10, wherein step (c) comprises increasing or decreasing a currently activated layer by one according to the motion pattern if the motion depth is larger than a predetermined threshold value.

17. The method of claim 16, wherein step (c) further comprises maintaining a currently active layer if the motion depth is not larger than the predetermined threshold value.

18. The method of claim 16, wherein step (c) further comprises resetting the motion depth in a currently active layer if the motion depth is larger than the predetermined threshold value.

* * * * *